(12) United States Patent
Abi-Nassif

(10) Patent No.: US 6,215,792 B1
(45) Date of Patent: Apr. 10, 2001

(54) SYSTEM, DEVICE, AND METHOD FOR INITIAL RANGING IN A COMMUNICATION NETWORK

(75) Inventor: Firass Abi-Nassif, South Boston, MA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/107,120

(22) Filed: Jun. 30, 1998

(51) Int. Cl.[7] .................................................. H04J 3/02
(52) U.S. Cl. ......................... 370/458; 370/447; 370/461; 348/12
(58) Field of Search .................................. 370/321, 324, 370/337, 347, 442, 445, 446, 447, 448, 461; 348/6, 12; 455/6.1

(56) References Cited

U.S. PATENT DOCUMENTS

| | | | |
|---|---|---|---|
| 4,630,264 | * 12/1986 | Wah et al. ............................. | 370/347 |
| 5,390,181 | *  2/1995 | Campbell et al. .................... | 370/347 |
| 5,579,321 | * 11/1996 | Van Grinsven et al. ............ | 370/347 |
| 5,699,515 | * 12/1997 | Berkema et al. ..................... | 370/447 |
| 5,793,759 | *  8/1998 | Rakib et al. .......................... | 370/342 |

OTHER PUBLICATIONS

Smythe et al., "Standards for Interactive Multimedia Delivery Across CATV Infrastructures", International Broadcasting Convention, Sep. 12–16, 1997, pp. 37–42.*

* cited by examiner

*Primary Examiner*—Wellington Chin
*Assistant Examiner*—Frank Duong
(74) *Attorney, Agent, or Firm*—Joanne N. Pappas

(57) ABSTRACT

A system, device, and method for initial ranging dynamically adjusts the backoff window size used during a ranging and adjustment process in an attempt to maximize the probability of success outcomes during contention access. The adaptive initial ranging scheme takes a first system performance measurement using a first backoff window size, takes a second system performance measurement using a second backoff window size different than the first backoff window size, and determines a third backoff window size based on the first and second system performance measurements. More specifically, the adaptive initial ranging scheme first provides ranging opportunities and specifies a first backoff window size for collision resolution, counts a first number of success outcomes in a first sample of ranging opportunity slots, and determines a first probability of success outcomes. The adaptive initial ranging scheme then provides additional ranging opportunities and specifies a second backoff window size for collision resolution, skips a number of ranging opportunity slots at least equal to the first backoff window size, counts a second number of success outcomes in a second sample of ranging opportunity slots, determines a second probability of success outcomes, determines a ratio R having a numerator equal to the second probability of success outcomes minus the first probability of success outcomes and a denominator equal to the second backoff window size minus the first backoff window size, and selects a third backoff window size based on at least the ratio R.

12 Claims, 6 Drawing Sheets

SYSTEM, DEVICE, AND METHOD FOR INITIAL RANGING IN A COMMUNICATION NETWORK

BACKGROUND

1. Field of the Invention

The invention relates generally to communication systems, and more particularly to performing an initial ranging function in a communication network.

2. Discussion of Related Art

In today's information age, there is an increasing need for high-speed communication networks that provide Internet access and other on-line services for an ever-increasing number of communications consumers. To that end, communications networks and technologies are evolving to meet current and future demands. Specifically, new networks are being deployed which reach a larger number of end users, and protocols are being developed to utilize the added bandwidth of these networks efficiently.

One technology that has been widely employed and will remain important in the foreseeable future is the shared medium communication network. A shared medium communication network is one in which a single communications channel (the shared channel) is shared by a number of users such that uncoordinated transmissions from different users may interfere with one another. The shared medium communication network typically includes a number of secondary stations that transmit on the shared channel, and a single primary station situated at a common receiving end of the shared channel for receiving the secondary station transmissions. Since communication networks typically have a limited number of communication channels, the shared medium communication network allows many users to gain access to the network over a single communication channel, thereby allowing the remaining communication channels to be used for other purposes.

One type of shared medium communication network divides the shared channel into successive time slots. In such a shared medium communication network, all of the secondary stations must be synchronized with the time slots, so that all secondary station transmissions begin and end within designated time slot(s). Therefore, when a secondary station connects to the shared medium communication network or otherwise attempts to establish a connection in the shared medium communication network, the secondary station performs a ranging function to synchronize with the time slots on the shared channel. The ranging function typically involves an exchange of messages between the primary station and the secondary station by which the secondary station aligns itself with the start of each time slot after compensating for propagation delay and other factors.

One problem in a shared medium communication network involves the ranging of many secondary stations, for example, following a reset or reinitialization of the primary station. For convenience, the ranging of multiple secondary stations following a reset or reinitialization of the primary station is referred to as "initial ranging." When many secondary stations attempt to perform the ranging function simultaneously, the secondary stations are forced to contend for access to the shared channel. It therefore becomes difficult for any of the secondary stations to complete the ranging function due to the large number of collisions caused by the contention access. As a result, the time needed for all of the secondary stations to complete the ranging function is excessive, and much bandwidth on the shared channel is wasted.

Thus, an efficient initial ranging process is needed.

SUMMARY OF THE INVENTION

A system, device, and method for performing initial ranging dynamically adjusts the backoff window size used during a ranging and adjustment process in an attempt to maximize the probability of success outcomes during contention access. The instant invention's adaptive initial ranging scheme includes taking a first system performance measurement using a first backoff window size, taking a second system performance measurement using a second backoff window size different than the first backoff window size, and determining a third backoff window size based on the first and second system performance measurements. The adaptive initial ranging scheme further provides ranging opportunities and specifies a first backoff window size for collision resolution, counts a first number of success outcomes in a first sample of ranging opportunity slots, and determines a first probability of success outcomes. The adaptive initial ranging scheme still further provides additional ranging opportunities and specifies a second backoff window size for collision resolution, skips a number of ranging opportunity slots at least equal to the first backoff window size, counts a second number of success outcomes in a second sample of ranging opportunity slots, determines a second probability of success outcomes, determines a ratio R having a numerator equal to the second probability of success outcomes minus the first probability of success outcomes and a denominator equal to the second backoff window size minus the first backoff window size, and selects a third backoff window size based on at least the ratio R.

DETAILED DESCRIPTION

Figure 1:
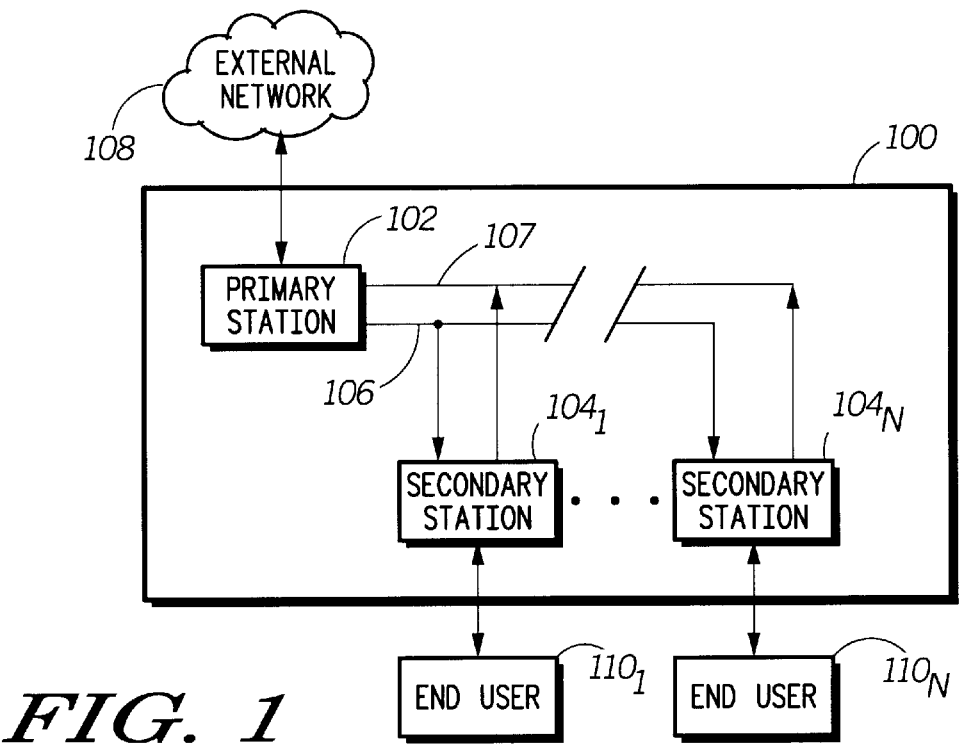
FIG. 1 is a block diagram showing an exemplary shared medium communication network in accordance with a preferred embodiment of the present invention.

FIG. 1 shows a shared medium communication network 100 in accordance with a preferred embodiment of the present invention. The shared medium communication network 100 allows a number of end users $110_1$ through $110_N$ to access a remote external network 108 such as the Internet. The shared medium communication network 100 acts as a conduit for transporting information between the end users 110 and the external network 108.

The shared medium communication network 100 includes a primary station 102 that is coupled to the external network 108. The primary station 102 is in communication with a plurality of secondary stations $104_1$ through $104_N$ (collectively referred to as "secondary stations 104" and individually as a "secondary station 104") by means of channels 106 and 107. Channel 106 carries information in a "downstream" direction from the primary station 102 to the secondary stations 104, and is hereinafter referred to as "downstream channel 106." Channel 107 carries information in an "upstream" direction from the secondary stations 104 to the primary station 102, and is hereinafter referred to as "upstream channel 107." Each end user 110 interfaces to the shared medium communication network 100 by means of a secondary station 104.

In a preferred embodiment, the shared medium communication network 100 is a data-over-cable (DOC) communication system wherein the downstream channel 106 and the upstream channel 107 are separate channels carried over a shared physical medium. In the preferred embodiment, the shared physical medium is a hybrid fiber-optic and coaxial cable (HFC) network. The downstream channel 106 is one of a plurality of downstream channels carried over the HFC network. The upstream channel 107 is one of a plurality of upstream channels carried over the HFC network. In other embodiments, the shared physical medium may be coaxial cable, fiber-optic cable, twisted pair wires, and so on, and may also include air, atmosphere, or space for wireless and satellite communication. Also, the various upstream and downstream channels may be the same physical channel, for example, through time-division multiplexing/duplexing, or separate physical channels, for example, through frequency-division multiplexing/duplexing.

In the shared medium communication network 100 of the preferred embodiment, the downstream channels, including the downstream channel 106, are typically situated in a frequency band above approximately 50 MHz, although the particular frequency band may vary from system to system, and is often country-dependent. The downstream channels are classified as broadcast channels, since any information transmitted by the primary station 102 over a particular downstream channel, such as the downstream channel 106, reaches all of the secondary stations 104. Any of the secondary stations 104 that are tuned to receive on the particular downstream channel can receive the information.

In the shared medium communication network 100 of a preferred embodiment, the upstream channels, including the upstream channel 107, are typically situated in a frequency band between approximately 5 through 42 MHz, although the particular frequency band may vary from system to system, and is often country-dependent. The upstream channels are classified as shared channels, since only one secondary station 104 can successfully transmit on a particular upstream channel at any given time, and therefore the upstream channels must be shared among the plurality of secondary stations 104. If more than one of the secondary stations 104 simultaneously transmit on a particular upstream channel, such as the upstream channel 107, there is a collision that corrupts the information from all of the simultaneously transmitting secondary stations 104.

In order to allow multiple secondary stations 104 to share a particular upstream channel, such as the upstream channel 107, the primary station 102 and the secondary stations 104 participate in a medium access control (MAC) protocol. The MAC protocol provides a set of rules and procedures for coordinating access by the secondary stations 104 to the shared upstream channel 107. Each secondary station 104 participates in the MAC protocol on behalf of its end users. For convenience, each participant in the MAC protocol is referred to as a "MAC User."

In a preferred embodiment, the MAC protocol includes a protocol commonly referred to as Multimedia Cable Network System (MCNS), which is defined in the document entitled MCNS Data-Over-Cable Service Interface Specifications Radio Frequency Interface Specification SP-RFI-102-971008 Interim Specification (hereinafter referred to as the "MCNS Protocol Specification"), incorporated herein by reference in its entirety. The MCNS Protocol Specification utilizes a slotted upstream channel, such that the upstream channel 107 is divided into successive time slots referred to as mini-slots. More specifically, the upstream channel 107 is modeled as a stream of mini-slots, providing for time-division multiple access (TDMA) at regulated time ticks. The use of mini-slots implies strict timing synchronization between the primary station 102 and all of the secondary stations 104. Hence, the primary station 102 generates time reference signals that allow the secondary stations 104 to identify mini-slot boundaries. Also, each secondary station 104 is required to perform a ranging function by which it synchronizes to the mini-slots on the upstream channel. The primary station 102 provides ranging opportunities so that each secondary station 104 can establish and maintain synchronization with the mini-slots on the upstream channel.

The MCNS Protocol Specification further divides the upstream channel 107 into successive frames, where each frame includes a number of mini-slots. The primary station 102 allocates bandwidth to a group of secondary stations 104 by transmitting on the downstream channel 106 a control message containing a bandwidth allocation information element known as a MAP. The MAP message specifies the allocation of transmission opportunities within a given transmission frame. For convenience, the control message containing the MAP is hereinafter referred to as the MAP message.

In accordance with the MCNS Protocol Specification, each frame is organized into discrete intervals. Each interval is used to support a particular MAC function. One type of interval, referred to as a request interval, allows secondary stations 104 to contend for bandwidth by transmitting a reservation request message or small data packet in contention mode. Another type of interval, referred to as a data grant interval, allows specific secondary stations 104 to transmit data packets contention-free in designated mini-slots. Yet another type of interval, referred to as an initial maintenance interval, allows secondary stations 104 to transmit ranging request messages in contention mode for establishing synchronization with the mini-slots on the upstream channel.

Before a secondary station 104 can transmit a ranging request message in an initial maintenance interval as part of the ranging function, the secondary station 104 first synchronizes to the downstream channel 106. This involves, among other things, synchronizing to the modulation and forward error correction on the downstream channel 106. The secondary station 104 then monitors the downstream channel 106 for an Upstream Channel Descriptor (UCD) message that defines a set of operating parameters for the upstream channel 107. The secondary station 104 then monitors the downstream channel 106 for a MAP message including an initial maintenance interval, and transmits a ranging request message during the initial maintenance interval.

The primary station 102 monitors the upstream channel 107 for ranging requests transmitted during the initial maintenance intervals. For each initial maintenance interval provided by the primary station 102, the primary station 102 receives either (1) no transmission, indicating that no secondary station 104 transmitted in the initial maintenance interval; (2) a ranging request message, indicating that a single secondary station 104 transmitted in the initial maintenance interval; or (3) a garbled message, indicating that either multiple ranging request transmissions collided or the information transmitted in the initial maintenance interval was corrupted by noise. For convenience, the three outcomes are referred to as idle, success, and garbled, respectively.

When the primary station 102 receives a ranging request message from a particular secondary station 104, the primary station 102 transmits a ranging response message to the secondary station 104 over the downstream channel 106. The ranging response message allows the secondary station 104 to complete the ranging function by synchronizing to the mini-slots on the upstream channel 107.

Thus, after transmitting the ranging request message, the secondary station 104 monitors the downstream channel 106 for a ranging response message from the primary station 102 acknowledging receipt of the ranging request message. If the secondary station 104 receives the ranging response message from the primary station 102, then the secondary station 104 completes the ranging function by adjusting its timing to synchronize with the mini-slots on the upstream channel 107. However, if the secondary station 104 does not receive the ranging response message within a predetermined time-out period, then the secondary station 104 re-contends in subsequent initial maintenance intervals as part of an adjustment process (discussed in section 7.2.5 of the MCNS Protocol Specification).

In accordance with the MCNS Protocol Specification, the adjustment process includes a backoff scheme (discussed in section 6.4.4 of the MCNS Protocol Specification) in which each contending secondary station 104 re-transmits the ranging request message after skipping a randomly selected number of ranging opportunities. The randomly selected number must be within a predetermined backoff window W, which is initially equal to a predetermined backoff window starting value, and is doubled each time the secondary station 104 re-contends up to a predetermined backoff window ending value. The primary station 102 specifies the backoff window starting value and the backoff window ending value in the MAP messages.

One objective of the primary station 102 is to range all of the secondary stations 104 as quickly as possible using as few ranging opportunities as possible. In accordance with a preferred embodiment of the present invention, the primary station 102 dynamically adjusts the backoff window size (i.e., the backoff window starting and ending values) in an attempt to maximize the probability of success outcomes in response to the ranging opportunities provided. The probability of success outcomes is based on, among other things, the number of contending secondary stations 104 and the backoff window size. Since the number of contending secondary stations 104 is not known by the primary station 102, the primary station 102 must estimate the number of contending secondary stations in order to set the backoff window size appropriately.

Figure 2:
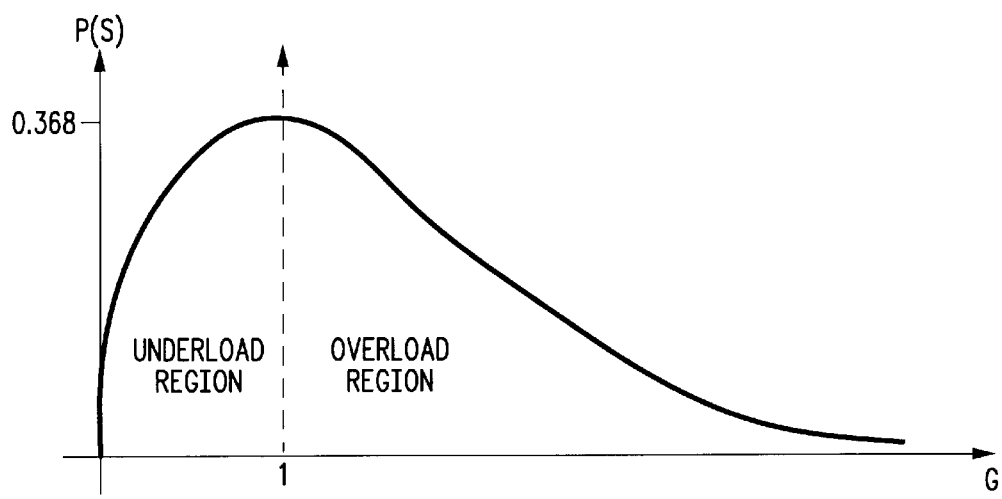
FIG. 2 is a plot of the expected probability of success outcomes as a function of the offered load of the system.

When a large number of the secondary stations 104 attempt to complete the ranging function, for example, following a power outage or primary station 102 reset, the system can be approximated by a slotted ALOHA system as is known in the art. In the slotted ALOHA system, the probability of a successful outcome P(S) for a contention opportunity is equal to:

$$P(S)=G\exp(-G)$$

where G represents the number of arrivals per contention opportunity (i.e., the offered load) of the system. A plot of the probability of success P(S) as a function of G is shown in FIG. 2. As shown in FIG. 2, P(S) reaches a theoretical maximum value of 0.368 when G is equal to one. It is an objective of the present invention to dynamically adjust the backoff window size such that P(S) remains as close as possible to the theoretical maximum value.

The region of the plot where G is less than one represents an underload region. The underload region is considered to be a stable region, since an increase in the offered load results in an increase in P(S). However, in the underload region, the number of ranging opportunities is larger than the optimal number of ranging opportunities, resulting in few collision outcomes, many idle outcomes, and hence few success outcomes. Therefore, when operating in the underload region, it is typically desirable to reduce the backoff window size to increase the probability of success P(S).

The region of the plot where G is greater than one represents an overload region. The overload region is considered to be an unstable region, since an increase in the offered load results in a decrease in P(S). However, in the overload region, the number of ranging opportunities is smaller than the optimal number of ranging opportunities, resulting in many collision outcomes, few idle outcomes, and hence few success outcomes. Therefore, when operating in the overload region, it is typically desirable to increase the backoff window size to increase the probability of success P(S).

In accordance with a preferred embodiment of the present invention, the primary station 102 is readily able to measure a probability of success outcomes P(S). Specifically, the primary station 102 counts the actual number of success outcomes received in some number of ranging opportunity slots and divides by the number of ranging opportunity slots in the sample window to obtain the measured P(S). Thus, the measured P(S) represents an instantaneous measurement of the probability of success outcomes within the sample window.

Figure 3:
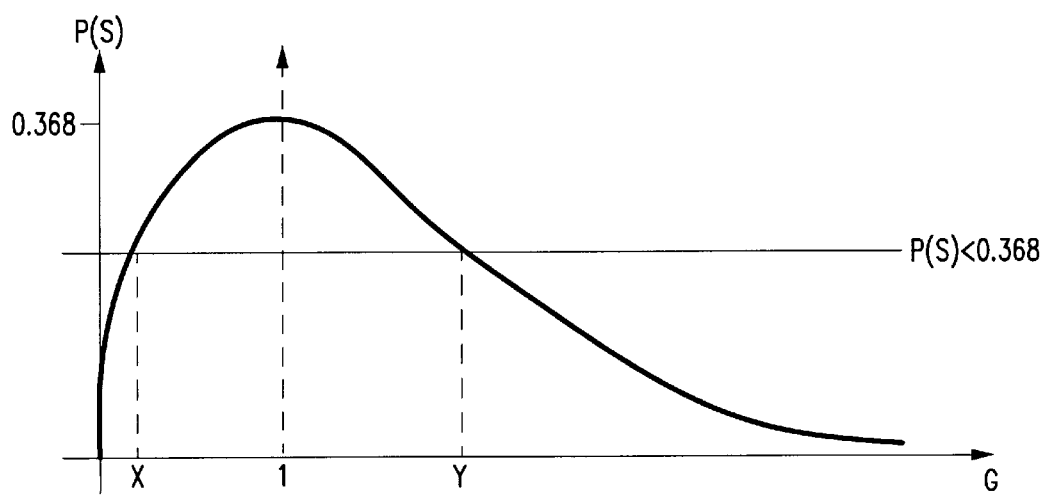
FIG. 3 is a plot showing two points having the same probability of success outcomes mapping to two different values for the offered load of the system.

Since P(S) is readily measured and is a function of the offered load G as shown in FIG. 2, it is desirable that the measured P(S) be used to estimate the offered load G and thereby to determine the operating region of the system. Unfortunately, unless the measured P(S) is exactly equal to the theoretical maximum value 0.368, the measured P(S) does not map to a unique value for the offered load G. If the measured P(S) is greater than the theoretical maximum value 0.368, then the measured P(S) has no corresponding point on the plot and is therefore indeterminate of the offered load G. On the other hand, if the measured P(S) is less than the theoretical maximum value 0.368, then the measured P(S) maps to two distinct points on the plot, one in the underload region corresponding to an offered load G=X and one in the overload region corresponding to an offered load G=Y, as shown in FIG. 3. Thus, the measured P(S) alone is inadequate for estimating the offered load G and determining the operating region of the system.

In accordance with a preferred embodiment of the present invention, the primary station 102 uses two indicators to determine the operating region of the system. The first indicator is a ratio R calculated from the measured P(S) in two different sample windows. The second indicator is a measured probability of garbled outcomes PG within a sample window. Each of the indicators provides an indication of the operating region of the system, although neither parameter alone is definitive.

In accordance with a preferred embodiment of the present invention, the primary station 102 measures the probability of success outcomes P(S) in two consecutive sample windows, each having a different backoff window size, and determines the ratio R as follows:

$$R=[CURR\_PS-PREV\_PS]/[CURR\_W-PREV\_W]$$

where CURR_PS and CURR_W represent the probabilty of success outcomes and backoff window size during the most recent sample window, respectively, and where PREV_PS and PREV_W represent the probabilty of success outcomes and backoff window size during the previous sample window, respectively. If the system is operating in the underload region, then the ratio R will typically be negative, since a decrease in the backoff window size W results in an increase in P(S), and vice versa. If the system is operating in the overload region, then the ratio R will typically be positive, since a decrease in the backoff window size W results in a decrease in P(S), and vice versa. Thus, the measured P(S) together with the sign of R are indicative of the operating region of the system, and can therefore be used as the basis for adjusting the backoff window size.

Figure 4:
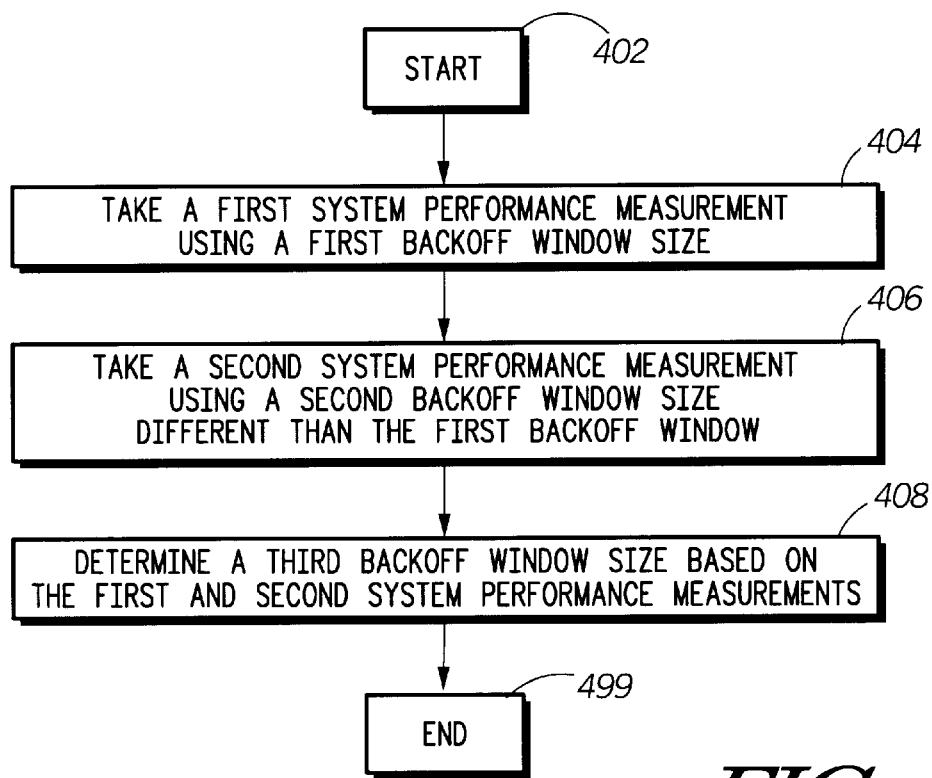
FIG. 4 is a logic flow diagram showing exemplary adaptive initial ranging logic in accordance with a preferred embodiment of the present invention.

FIG. 4 is a logic flow diagram showing exemplary adaptive initial ranging logic in accordance with a preferred embodiment of the present invention. As discussed above, the adaptive initial ranging scheme relies upon two distinct performance measurements using different backoff window sizes. Therefore, as shown in FIG. 4, the adaptive initial ranging scheme begins at step 402, and proceeds to take a first system performance measurement using a first backoff window size (PREV_W), in step 404. The first system performance measurement provides the values PREV_PS and PREV_W. The adaptive initial ranging scheme then takes a second system performance measurement using a second backoff window size (CURR_W) different than the first backoff window size, in step 406. The second system performance measurement provides the values CURR_PS, CURR_W, and PG. The adaptive initial ranging scheme then determines a new backoff window size (i.e., a new value for CURR_W) based on the first and second system performance measurements, in step 408, and terminates at step 499.

Figure 5:
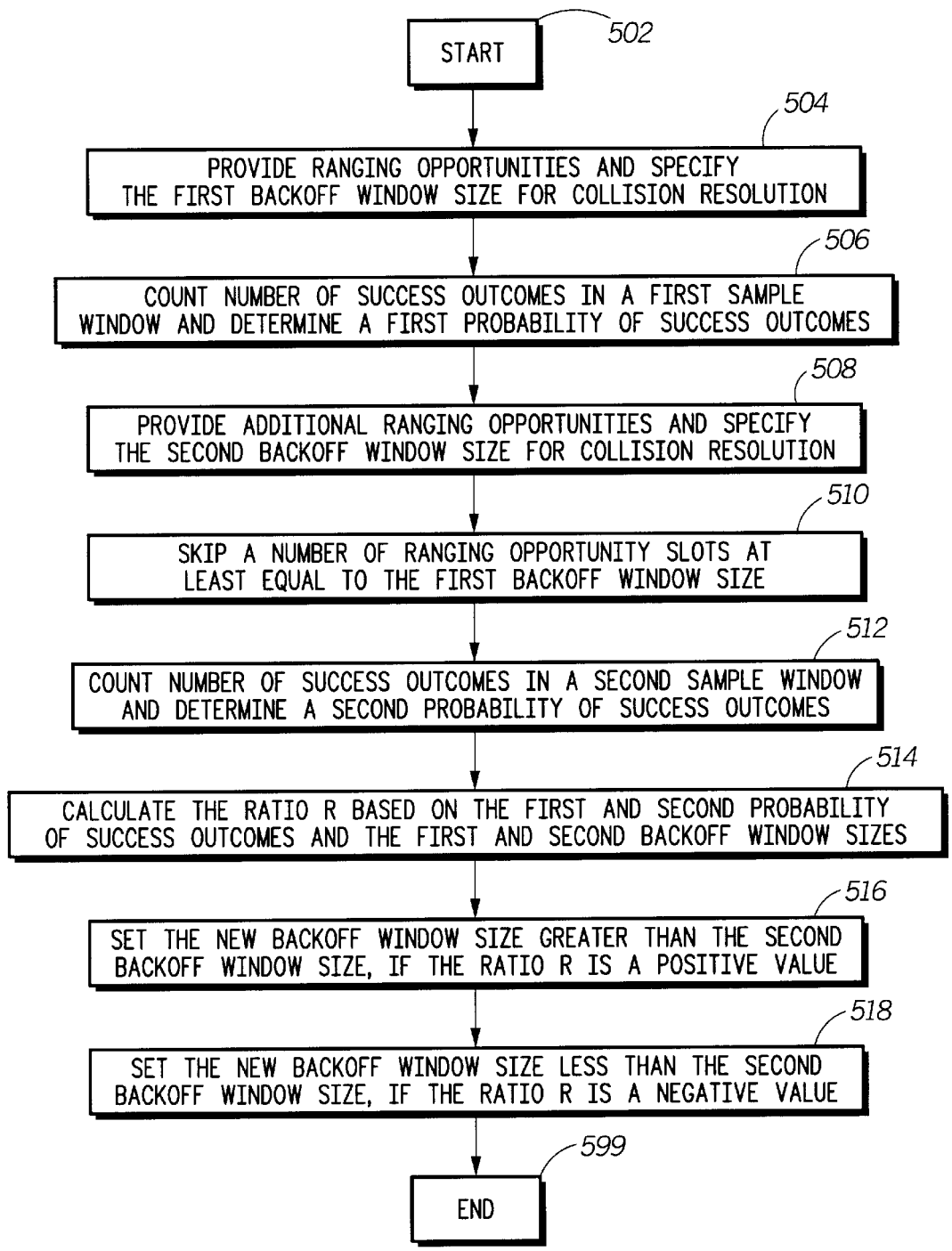
FIG. 5 is a logic flow diagram showing adaptive initial ranging logic in accordance with a first exemplary embodiment of the present invention.

FIG. 5 is a logic flow diagram showing adaptive initial ranging logic in accordance with a first exemplary embodiment of the present invention that uses the ratio R to adjust the backoff window size and ranging opportunity frequency. After beginning in step 502, the logic provides ranging opportunities and specifies the first backoff window size for collision resolution, in step 504. The logic then counts a first number of success outcomes in a first sample window and determines a first probability of success outcomes (PREV_PS), in step 506. The first probability of success outcomes (PREV_PS) is equal to the number of success outcomes received in the first sample window divided by the number of ranging opportunity slots in the first sample window.

After determining the first probability of success outcomes in step 506, the logic provides additional ranging opportunities and specifies the second backoff window size for collision resolution, in step 508. The logic skips a number of ranging opportunity slots at least equal to the first backoff window size in step 510, and then counts the number of success outcomes in a second sample window to determine a second probability of success outcomes (CURR_PS), in step 512. The second probability of success outcomes (CURR_PS) is equal to the number of success outcomes received in the second sample window divided by the number of ranging opportunity slots in the second sample window.

After determining the second probability of success outcomes in step 512, the logic calculates the ratio R based on the values CURR_PS, PREV_PS, CURR_W, and PREV_W, in step 514. The logic then determines the new backoff window size. Specifically, if the ratio R is a positive value, then the logic sets the new backoff window size greater than the second backoff window size, in step 516. However, if the ratio R is a negative value, then the logic sets the new backoff window size less than the second backoff window size, in step 518. The logic terminates in step 599.

Unfortunately, it is possible for the ratio R to incorrectly indicate the operating region of the system. One condition under which the ratio R can incorrectly indicate the operating region of the system is when the value of CURR_PS or PREV_PS (or both) is disproportionate to the expected probability of success outcomes based on the actual offered load G during the corresponding sample window. This can happen, for example, when the sample window size is relatively small (which is the case in a preferred embodiment of the present invention described below). If the ratio R incorrectly indicates the operating region of the system, then the backoff window size may be incorrectly adjusted, causing the probability of success outcomes in subsequent sample windows to decrease rather than increase.

Thus, in accordance with a preferred embodiment of the present invention, the primary station 102 measures a probability of garbled outcomes PG, and uses PG as a second indicator (i.e., in addition to the ratio R) of the operating region of the system. Specifically, the primary station 102 counts the actual number of garbled outcomes (i.e., corrupted messages due to collisions or noise) received during the sample window and divides by the number of ranging opportunity slots in the sample window to obtain PG. If PG is very small, for example, less than 0.3, then the system is likely to be operating in the underload region, where it would be desirable to decrease the backoff window size. If PG is very large, for example, greater than 0.8, then the system is likely to be operating in the overload region, where it would be desirable to increase the backoff window size.

Figure 6:
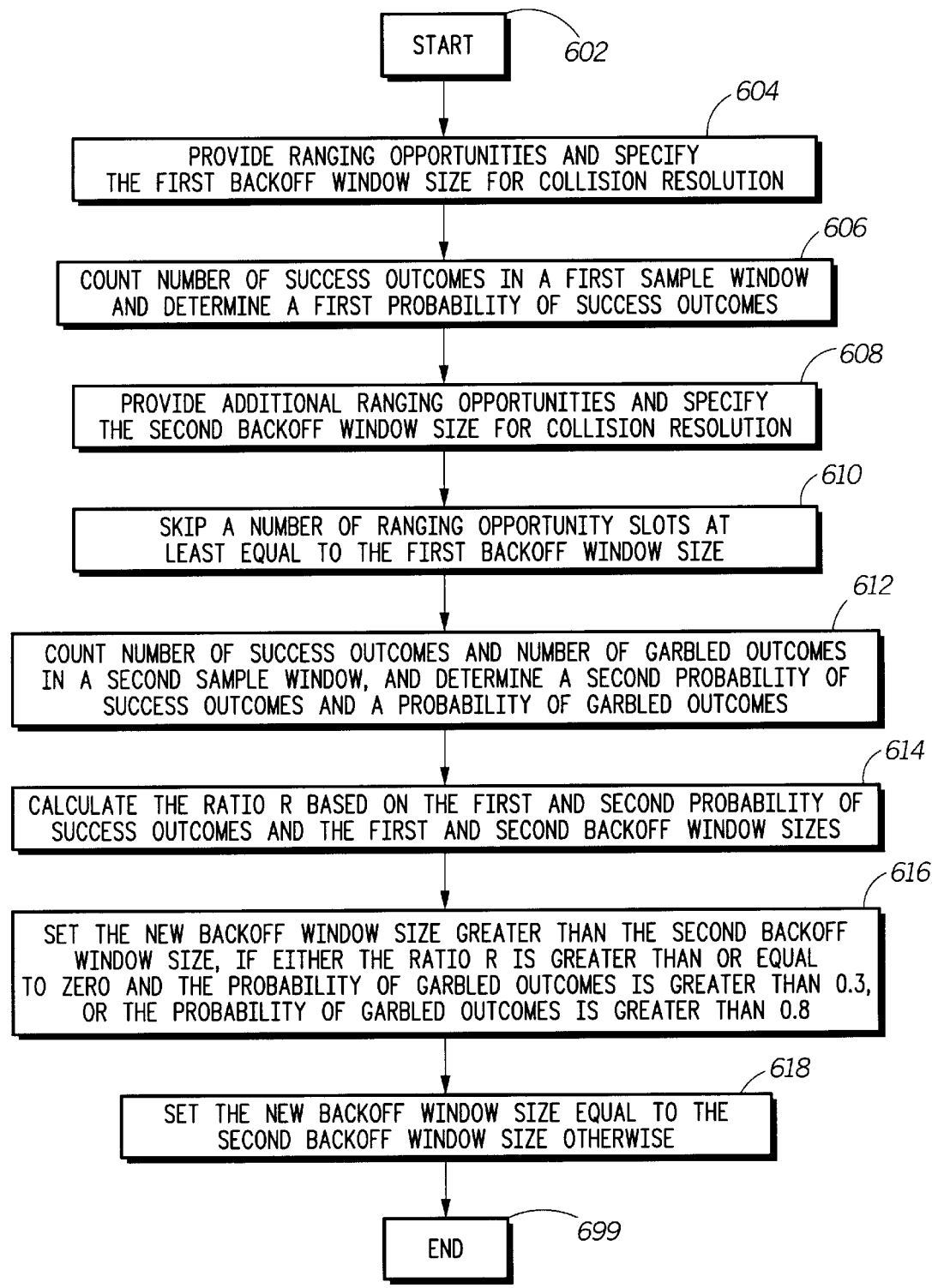
FIG. 6 is a logic flow diagram showing adaptive initial ranging logic in accordance with a second exemplary embodiment of the present invention.

FIG. 6 is a logic flow diagram showing adaptive initial ranging logic in accordance with a second exemplary embodiment of the present invention that uses both the ratio R and the probability of garbled outcomes PG to adjust the backoff window size. After beginning in step 602, the logic provides ranging opportunities and specifies the first backoff window size for collision resolution, in step 604. The logic then counts a first number of success outcomes in a first sample window and determines a first probability of success outcomes (PREV_PS), in step 606. The first probability of success outcomes (PREV_PS) is equal to the number of success outcomes received in the first sample window divided by the number of ranging opportunity slots in the first sample window.

After determining the first probability of success outcomes in step 606, the logic provides additional ranging opportunities and specifies the second backoff window size for collision resolution, in step 608. The logic skips a number of ranging opportunity slots at least equal to the first backoff window size in step 610, and then counts the number of success outcomes and the number of garbled outcomes in a second sample window to determine a second probability of success outcomes (CURR_PS) and a probability of garbled outcomes (PG), in step 612. The second probability of success outcomes (CURR_PS) is equal to the number of success outcomes received in the second sample window divided by the number of ranging opportunity slots in the second sample window. The probability of garbled outcomes (PG) is equal to the number of garbled outcomes received in the second sample window divided by the number of ranging opportunity slots in the second sample window.

After determining the second probability of success outcomes and the probability of garbled outcomes in step 612, the logic calculates the ratio R based on the values CURR_PS, PREV_PS, CURR_W, and PREV_W, in step 614. The logic then determines the new backoff window size. Specifically, if either (1) the ratio R is greater than or equal to zero and PG is greater than 0.3, or (2) PG is greater than 0.8, then the logic sets the new backoff window size greater than the second backoff window size, in step 616. Otherwise, the logic sets the new backoff window size less than the second backoff window size, in step 618. The logic terminates in step 699.

A preferred embodiment of the present invention applies the above principles to an adaptive initial ranging scheme that operates under the following assumptions:
1) The maximum number of secondary stations that are permitted to contend during initial ranging is 500;
2) The primary station does not know the actual number of secondary stations that contend during initial ranging;
3) The primary station is capable of providing a maximum of 50 ranging opportunities per second;
4) The primary station is not capable of determining the number of collisions during a certain time period, although the primary station is capable of determining the number of garbled transmissions (which includes transmissions garbled due to collisions and noise);
5) Each secondary station transmits at an appropriate transmit power level to allow its transmissions to be received by the primary station; and
6) The backoff window size is a power of two.

In accordance with a preferred embodiment of the present invention, the backoff window starting value and the backoff window ending value are set equal to a common value CURR_W during operation of the adaptive initial ranging scheme. During the adjustment process, each secondary station randomly selects a number within the current backoff window CURR_W, and defers transmitting its ranging request by the selected number of ranging opportunities. Each secondary station that transmits a ranging request awaits a ranging response from the primary station. If a secondary station receives a ranging response within a predetermined time-out period, then the ranging process is complete for that secondary station, and the secondary station does not contend in subsequent ranging opportunities. However, if the secondary station fails to receive a ranging response within the predetermined time-out period, then the secondary station participates in the adjustment process, using the most recently received value of CURR_W as the backoff window for collision resolution. In accordance with the MCNS Protocol Specification, the predetermined time-out period utilized in a preferred embodiment of the present invention is 100 milliseconds.

Figure 7:
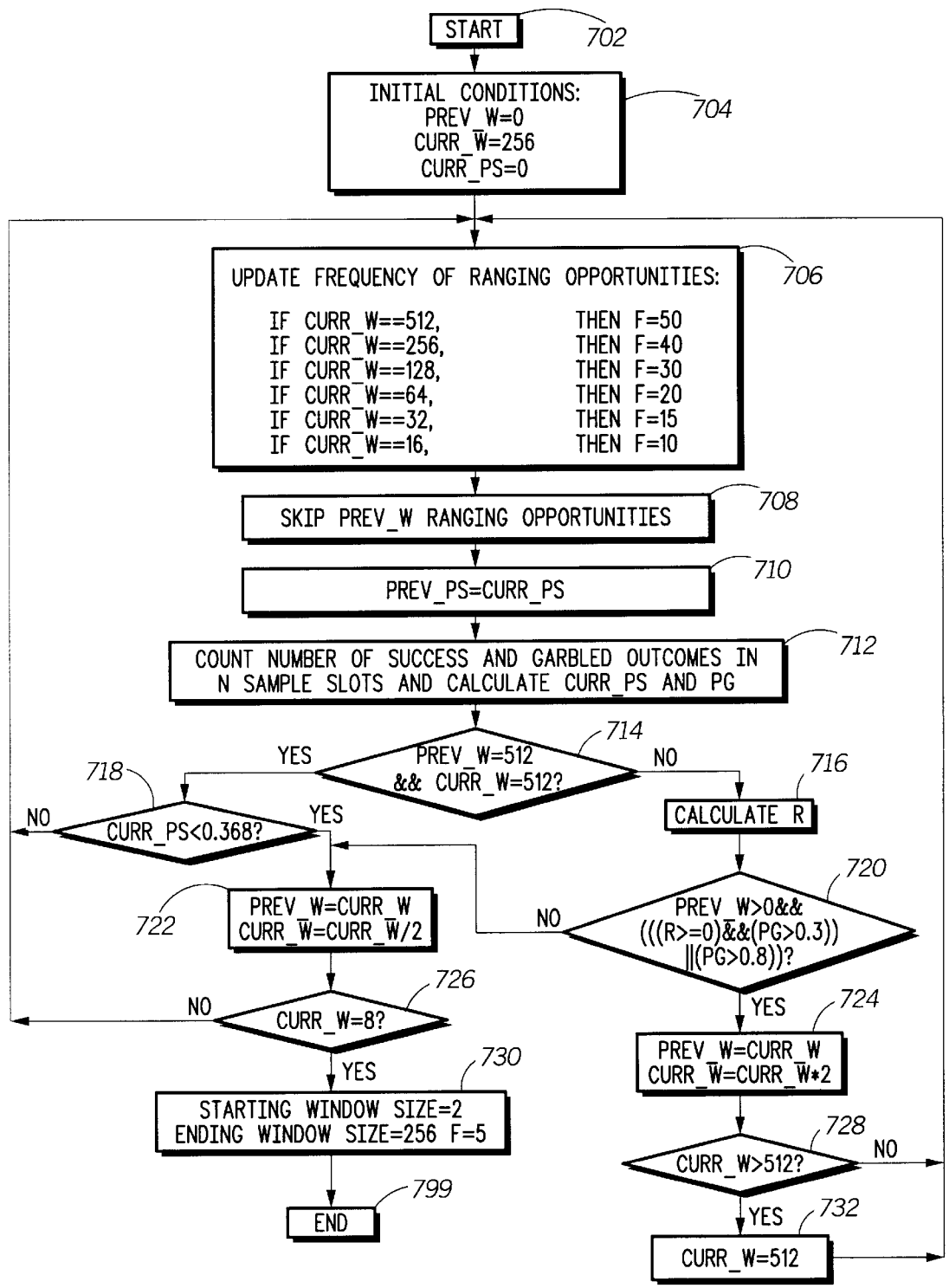
FIG. 7 is a logic flow diagram showing the iterative process for dynamically updating the backoff window size and ranging opportunity frequency in accordance with a preferred embodiment of the present invention.

The preferred adaptive initial ranging scheme utilizes an iterative process to dynamically update the backoff window size, as shown in FIG. 7. The logic begins at step 702 and proceeds to set up the initial conditions for the first iteration of the logic in step 704. Specifically, for the first iteration of the logic, the previous window size PREV_W is set to zero, the initial window size CURR_W is set to 256, and the current probability of success CURR_PS is set to zero. The logic then proceeds to the iterative steps, beginning at step 706.

At step 706, the logic updates the frequency of ranging opportunities (represented by the variable F) based on the current window size CURR_W. The purpose of this adjustment is to fairly allocate the upstream bandwidth between the initial maintenance intervals on the one hand, and the request and data grant intervals on the other hand. Specifically, when few secondary stations 104 have completed the ranging process, it is appropriate to allocate a large proportion of the bandwidth to the initial maintenance intervals. However, as more and more secondary stations 104 complete the ranging process and begin passing data, it is appropriate to shift the allocation of bandwidth from the initial maintenance intervals to the request and data grant intervals. Since the value of the current backoff window size CURR_W is based on an estimation of the offered load (which is related to the number of contending secondary stations), the current backoff window size CURR_W is used to determine an appropriate ranging opportunity frequency.

In accordance with a preferred embodiment of the present invention, each backoff window size is associated with a specific ranging opportunity frequency. If CURR_W is equal to 512, then F is set to 50 ranging opportunities per second. If CURR_W is equal to 256, then F is set to 40 ranging opportunities per second. If CURR_W is equal to 128, then F is set to 30 ranging opportunities per second. If CURR_W is equal to 64, then F is set to 20 ranging opportunities per second. If CURR_W is equal to 32, then F is set to 15 ranging opportunities per second. If CURR_W is equal to 16, then F is set to 10 ranging opportunities per second. After determining the new ranging opportunity frequency, the MAP messages are adjusted (if necessary) to provide ranging opportunities at the new ranging opportunity frequency.

After updating the ranging opportunity frequency in step 706, the logic measures the impact of the current backoff window size on the system. Specifically, after updating the ranging opportunity frequency in step 706, the logic first skips PREV_W ranging opportunities in step 708. The logic then saves the value of CURR_PS as PREV_PS in step 710. Lastly, the logic counts the number of success outcomes and the number of garbled outcomes in a predetermined number N of sample ranging opportunity slots and divides both by N to determine the probability of success outcomes CURR_PS and the probability of garbled outcomes PG, respectively, in step 712. In accordance with a preferred embodiment of the present invention, the predetermined number N of sample ranging opportunity slots is equal to twenty (20).

After measuring the impact of the updated ranging opportunity frequency and current window size on the system in steps 708–712, the logic adjusts the backoff window size based on the measured impact of the updated ranging opportunity frequency and current window size on the system, beginning at step 714. At step 714, if both PREV_W and CURR_W are equal to the maximum window size 512 (YES in step 714), then the logic proceeds to step 718. Otherwise (NO in step 714), the logic proceeds to step 716.

At step 716, the logic calculates the ratio R based on CURR_PS, CURR_W, PREV_PS, and PREV_W. The logic then determines whether CURR_W should be increased or decreased, in step 720. Specifically, if PREV_W is greater than zero and either (1) R is greater than or equal to zero and PG is greater than 0.3, or (2) PG is greater than 0.8 (YES in step 720), then the logic proceeds to step 724 to increase CURR_W. Otherwise (NO in step 720), the logic proceeds to step 722 to decrease CURR_W.

At step 724, the logic saves CURR_W as PREV_W and multiplies CURR_W by two (2). The logic then checks if CURR_W exceeds a maximum backoff window size equal to 512, in step 728. If CURR_W is less than or equal to 512 (NO in step 728), then the logic recycles to step 706. However, if CURR_W is greater than 512 (YES in step 728), then the logic resets CURR_W to 512, in step 732, and recycles to step 706.

At step 722, the logic saves CURR_W as PREV_W and divides CURR_W by two (2). The logic then checks if CURR_W has reached a predetermined minimum backoff window size equal to eight (8), in step 726. If CURR_W is greater than eight (8) (NO in step 726), then the logic recycles to step 706. However, if CURR_W is equal to eight (8) (YES in step 726), then the logic terminates the adaptive initial ranging procedure by setting the backoff window and ranging opportunity frequency to predetermined steady-state values, in step 730, and ending in step 799. In accordance with a preferred embodiment of the present invention, the steady-state backoff window starting value is equal to two (2), the steady-state backoff window ending value is equal to 256, and the steady-state ranging opportunity frequency is equal to five (5) ranging opportunities per second.

At step 718, the logic examines CURR_PS to determine whether CURR_W should be left unchanged or decreased. If CURR_PS is greater than or equal to the theoretical maximum value 0.368 (NO in step 718), then the logic recycles to step 706, leaving CURR_W unchanged. However, if CURR_PS is less than the theoretical maximum value 0.368 (YES in step 718), then the logic proceeds to step 722 to decrease CURR_W as described above.

It should be noted that the first iteration of the logic is used only for obtaining a first measurement of CURR_PS based on the initial window size CURR_W equal to 256. The initial value of PREV_W equal to zero ensures that the logic proceeds from step 714 to step 716 to step 720 to step 722, such that the value of CURR_W is decreased to 128 to provide a different backoff window size and ranging opportunity frequency for the second iteration of the logic. The value of R calculated in step 716 is not used during the first iteration of the logic, since it is based on only one sample (i.e., PREV_PS and PREV_W are both zero), and therefore is not a true indicator of the operating region of the system. After the first iteration of the logic, however, the value PREV_W will always be greater than zero, such that the value R calculated in step 716 will be an indicator of the operating region of the system.

It should also be noted that the reason for skipping PREV_W ranging opportunities in step 708 is to wait for the secondary stations to begin using the new backoff window before examining the ranging results in the N sample ranging opportunity slots. When CURR_W is changed to a new backoff window size at a particular time T, the new backoff window size does not affect secondary stations that contend prior to time T. This is because those secondary stations that contend prior to time T use the previous backoff window size PREV_W, while any secondary stations that contend after time T use the new backoff window size CURR_W. Therefore, after changing to the new backoff window size CURR_W at time T, the previous backoff window size PREV_W can be in effect at most PREV_W ranging opportunities following time T, after which all secondary stations must necessarily use the new backoff window size CURR_W. By skipping at least PREV_W ranging opportunities, the N sample ranging opportunity slots are certain to be within the new backoff window size CURR_W.

It should also be noted that the reason for limiting the backoff window size to a maximum of 512 is that the actual offered load over a backoff window size of 512 is necessarily less than one request per ranging opportunity slot, since at most 500 secondary stations are permitted to contend. Therefore, the expected probability of success outcomes with a backoff window size of 512 is already less than 0.368 when measured over the entire sample window. Thus, when the backoff window size is 512, it would typically be desirable to decrease the backoff window size and ranging opportunity frequency in an attempt to increase the probability of success outcomes. However, because the probability of success outcomes and the probability of garbled outcomes are measured over a relatively small sample window, it is possible for the measured values to be disproportionately large, resulting in an inadvertent increase of the backoff window size and ranging opportunity frequency. The increased backoff window size further lowers the probability of success outcomes. Therefore, when the backoff window size reaches 512, the backoff window size and ranging opportunity frequency is left unchanged until the measured P(S) falls below 0.368, at which time the backoff window size and ranging opportunity frequency is decreased.

Figure 8:
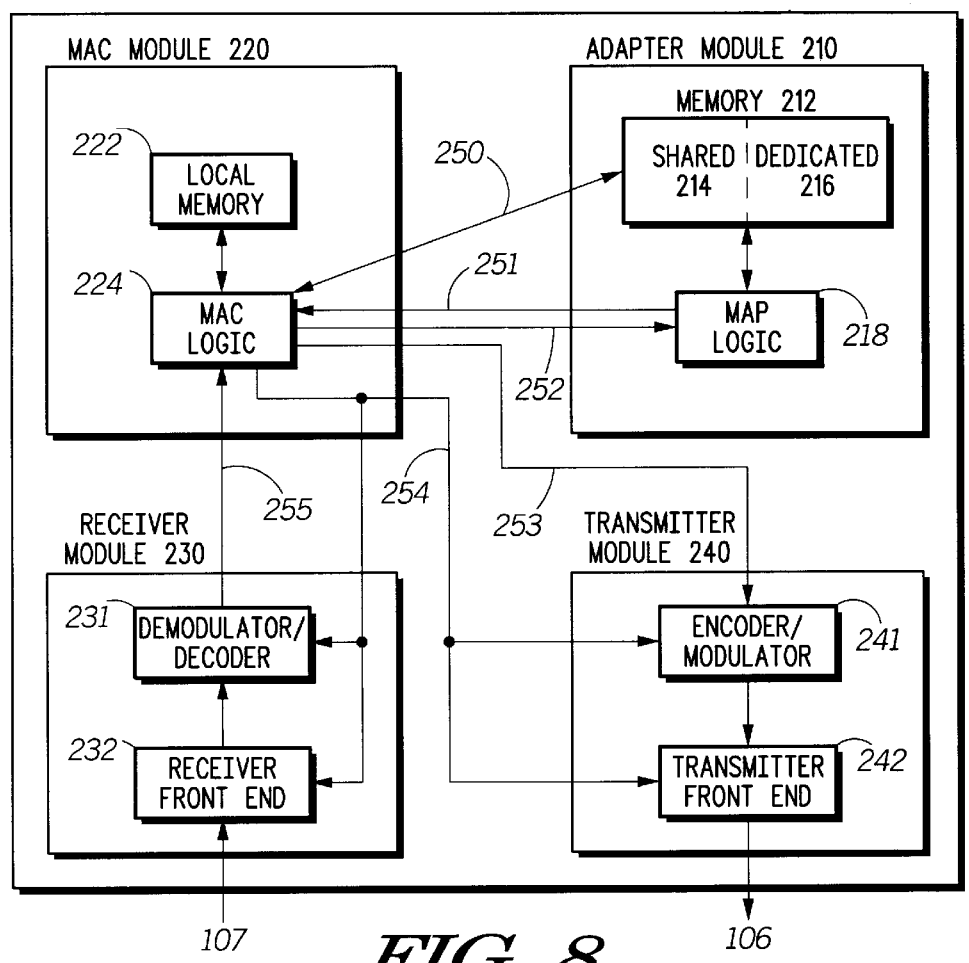
FIG. 8 is a block diagram showing an exemplary primary station in accordance with a preferred embodiment of the present invention.

FIG. 8 is a block diagram showing an exemplary primary station 102 in accordance with a preferred embodiment of the present invention. In the preferred embodiment, the primary station 102 includes a number of functional modules implemented on individual cards that fit within a common chassis. In order to enable communication within the shared medium communication network 100, the primary station 102 requires at least a minimum set of functional modules. Specifically, the minimum set of functional modules comprises an Adapter Module 210, a MAC Module 220, a Transmitter Module 240, and a Receiver Module 230. In the preferred embodiment, the minimum set of functional modules allows the primary station 102 to support a single downstream channel and up to eight upstream channels. For the sake of convenience and simplicity, the exemplary embodiments described below refer to the single upstream channel 107, although it will be apparent to a skilled artisan that multiple upstream channels are supportable in a similar manner.

The Adapter Module 210 controls the flow of data and control messages between the primary station 102 and the secondary stations 104. The Adapter Module 210 includes Control Logic 218 that is coupled to a Memory 212. The Control Logic 218 includes logic for dynamically adjusting the backoff window size and ranging opportunity frequency in accordance with the various embodiments of the present invention described heretofore. Specifically, the Control Logic 218 includes logic for processing ranging request messages and other data and control messages received from the secondary stations 104, and further includes logic for generating MAP messages, registration response messages, and other data and control messages for transmission to the secondary stations 104. The Memory 212 is divided into a Dedicated Memory 216 that is used only by the Control Logic 218, and a Shared Memory 214 that is shared by the Control Logic 218 and MAC Logic 224 (described below) for exchanging data and control messages.

The Control Logic 218 and the MAC Logic 224 exchange data and control messages using three ring structures (not shown) in the Shared Memory 214. Data and control messages received from the secondary station 104 are stored by the MAC Logic 224 in a Receive Queue in the Shared Memory 214 Control messages generated by the Control Logic 218 are stored by the Control Logic 218 in a MAC Transmit Queue in the Shared Memory 214. Data messages for transmission to the secondary station 104 are stored by the Control Logic 218 in a Data Transmit Queue in the Shared Memory 214. The Control Logic 218 monitors the Receive Queue to obtain the ranging request and other data and control messages received from the secondary stations 104. The MAC Logic 224 monitors the MAC Transmit Queue to obtain MAP messages, ranging response messages, and other control messages for transmission to the secondary stations 104. The MAC Logic 224 monitors the Data Transmit Queue to obtain data messages for transmission to the secondary stations 104.

The MAC Module 220 implements MAC functions within the primary station 102. The MAC Module 220 includes MAC Logic 224 that is coupled to a Local Memory 222 and to the Shared Memory 214 by means of interface 250. The MAC Logic 224 monitors the MAC Transmit Queue and the Data Transmit Queue in the Shared Memory 214. The MAC Logic 224 transmits any queued data and control messages to Encoder/Modulator 241 of Transmitter Module 240 by means of interface 253. The MAC Logic 224 also processes the data and control messages received from the Receiver Module 230 by means of interface 255. The MAC Logic 224 stores the received data and control messages in the Receive Queue in the Shared Memory 214 by means of interface 250.

The Transmitter Module 240 provides an interface to the downstream channel 106 for transmitting data and control messages to the secondary stations 104. The Transmitter Module 240 includes a Transmitter Front End 242 that is operably coupled to the downstream channel 106 and an Encoder/Modulator 241. The Encoder/Modulator 241 includes logic for processing data and control messages received from the MAC Logic 224 by means of interface 253. More specifically, the Encoder/Modulator 241 includes encoding logic for encoding the data and control messages according to a predetermined set of encoding parameters, and modulating logic for modulating the encoded data and control messages according to a predetermined modulation mode. The Transmitter Front End 242 includes logic for transmitting the modulated signals from the Encoder/Modulator 241 onto the downstream channel 106. More specifically, the Transmitter Front End 242 includes tuning logic for tuning to a downstream channel 106 center frequency, and filtering logic for filtering the transmitted modulated signals. Both the Encoder/Modulator 241 and the Transmitter Front End 242 include adjustable parameters, including downstream channel center frequency for the Transmitter Front End 242, and modulation mode, modulation symbol rate, and encoding parameters for the Encoder/Modulator 241.

The Receiver Module 230 provides an interface to the upstream channel 107 for receiving, among other things, data and control messages from the secondary stations 104. The Receiver Module 230 includes a Receiver Front End 232 that is operably coupled to the upstream channel 107 and to a Demodulator/Decoder 231. The Receiver Front End 232 includes logic for receiving modulated signals from the upstream channel 107. More specifically, the Receiver Front End 232 includes tuning logic for tuning to an upstream channel 107 center frequency, and filtering logic for filtering the received modulated signals. The Demodulator/Decoder 231 includes logic for processing the filtered modulated signals received from the Receiver Front End 232. More specifically, the Demodulator/Decoder 231 includes demodulating logic for demodulating the modulated signals according to a predetermined modulation mode, and decoding logic for decoding the demodulated signals according to a predetermined set of decoding parameters to recover data and control messages from the secondary station 104. Both the Receiver Front End 232 and the Demodulator/Decoder 231 include adjustable parameters, including upstream channel center frequency for the Receiver Front End 232, and modulation mode, modulation symbol rate, modulation preamble sequence, and decoding parameters for the Demodulator/Decoder 231.

In the preferred embodiment, the primary station 102 includes a configuration interface 254 through which the adjustable parameters on both the Receiver Module 230 and the Transmitter Module 240 are configured. The configuration interface 254 operably couples the MAC Logic 224 to the Demodulator/Decoder 231, the Receiver Front End 232, the Encoder/Modulator 241, and the Transmitter Front End 242. The configuration interface 254 is preferably a Serial Peripheral Interface (SPI) bus as is known in the art.

Figure 9:
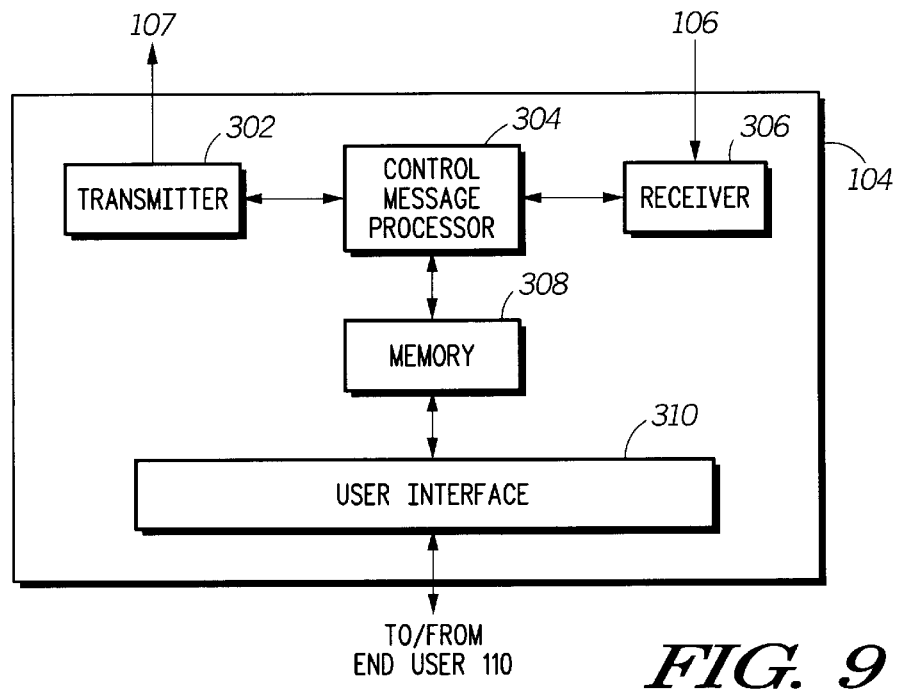
FIG. 9 is a block diagram showing an exemplary secondary station in accordance with a preferred embodiment of the present invention.

FIG. 9 is a block diagram showing an exemplary secondary station 104 in accordance with a preferred embodiment of the present invention. The secondary station 104 includes a User Interface 310 for interfacing with the End User 110. Data transmitted by the End User 110 is received by the User Interface 310 and stored in a Memory 308. The secondary station 104 also includes a Control Message Processor 304 that is coupled to the Memory 308. The Control Message Processor 304 participates as a MAC User in the MAC protocol on behalf of the End User 110. Specifically, the Control Message Processor 304 transmits ranging request messages and other data and control messages to the primary station 102 by means of Transmitter 302, which is operably coupled to transmit data and control messages on the upstream channel 107. The Control Message Processor 304 also processes MAP messages, ranging response messages, and other data and control messages received from the primary station 102 by means of Receiver 306, which is operably coupled to receive data and control messages on the downstream channel 106.

All logic described herein can be embodied using discrete components, integrated circuitry, programmable logic used in conjunction with a programmable logic device such as a Field Programmable Gate Array (FPGA) or microprocessor, or any other means including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

The present invention may be embodied in other specific forms without departing from the essence or essential characteristics. The described embodiments are to be considered in all respects only as illustrative and not restrictive.

What is claimed is:

1. A device for performing initial ranging in conjunction with a contention-based Medium Access Control (MAC) protocol in a shared-medium communication network, the device comprising adaptive initial ranging logic to provide ranging opportunities and to adjust a backoff window size based on the ranging opportunity outcomes, the adaptive initial ranging logic further comprising:

means for providing ranging opportunities and specifying a first backoff window size for collision resolution;

means for counting a first number of success outcomes in a first sample of N ranging opportunity slots;

means for determining a first probability of success outcomes equal to the first number of success outcomes divided by N;

means for providing additional ranging opportunities and specifying a second backoff window size for collision resolution;

means for skipping a number of ranging opportunity slots at least equal to the first backoff window size;

means for counting a second number of success outcomes in a second sample of N ranging opportunity slots;

means for determining a second probability of success outcomes equal to the second number of success outcomes divided by N;

means for determining a ratio R having a numerator equal to the second probability of success outcomes minus the first probability of success outcomes and a denominator equal to the second backoff window size minus the first backoff window size; and means for selecting a third backoff window size based on at least the ratio R.

2. The device of claim 1 wherein N is a predetermined sample size equal to twenty (20) ranging opportunity slots.

3. The device of claim 1 wherein:

the adaptive initial ranging logic sets the third backoff window size greater than the second backoff window size, if the ratio R is a positive value; and the adaptive initial ranging logic sets the third backoff window size less than the second backoff window size, if the ratio R is a negative value.

4. The device of claim 1 wherein the adaptive initial ranging logic:

counts a number of garbled outcomes in the second sample of N ranging opportunity slots;

determines a probability of garbled outcomes equal to the number of garbled outcomes divided by N; and selects the third backoff window size based on the ratio R and the probability of garbled outcomes.

5. The device of claim 4 wherein:

the adaptive initial ranging logic sets the third backoff window size greater than the second backoff window size, if either:

the ratio R is greater than or equal to zero, and the probability of garbled outcomes is greater than 0.3; or the probability of garbled outcomes is greater than 0.8; and the adaptive initial ranging logic sets the third backoff window size less than the second backoff window size otherwise.

6. The method of claim 1 wherein the MAC protocol is a Multimedia Cable Network System (MCNS) protocol.

7. A system comprising a primary station in communication with a number of secondary stations, wherein the primary station includes adaptive initial ranging logic to provide ranging opportunities and to adjust a backoff window size based on the ranging opportunity outcomes, the adaptive initial ranging logic:

providing ranging opportunities and specifying a first backoff window size for collision resolution;

counting a first number of success outcomes in a first sample of N ranging opportunity slots;

determining a first probability of success outcomes equal to the first number of success outcomes divided by N;

providing additional ranging opportunities and specifying a second backoff window size for collision resolution;

skipping a number of ranging opportunity slots at least equal to the first backoff window size;

counting a second number of success outcomes in a second sample of N ranging opportunity slots;

determining a second probability of success outcomes equal to the second number of success outcomes divided by N;

determining a ratio R having a numerator equal to the second probability of success outcomes minus the first probability of success outcomes and a denominator equal to the second backoff window size minus the first backoff window size; and selecting a third backoff window size based on at least the ratio R.

8. The system of claim 7 wherein N is a predetermined sample size equal to twenty (20) ranging opportunity slots.

9. The system of claim 7 wherein:

the adaptive initial ranging logic sets the third backoff window size greater than the second backoff window size, if the ratio R is a positive value; and the adaptive initial ranging logic sets the third backoff window size less than the second backoff window size, if the ratio R is a negative value.

10. The device of claim 7 wherein the adaptive initial ranging logic:

counts a number of garbled outcomes in the second sample of N ranging opportunity slots;

determines a probability of garbled outcomes equal to the number of garbled outcomes divided by N; and selects the third backoff window size based on the ratio R and the probability of garbled outcomes.

11. The system of claim 10 wherein:

the adaptive initial ranging logic sets the third backoff window size greater than the second backoff window size, if either:

the ratio R is greater than or equal to zero, and the probability of garbled outcomes is greater than 0.3; or the probability of garbled outcomes is greater than 0.8; and the adaptive initial ranging logic sets the third backoff window size less than the second backoff window size otherwise.

12. The system of claim 7 wherein the MAC protocol is a Multimedia Cable Network System (MCNS) protocol.

* * * * *